（12) United States Patent
Yoshida et al.

(10) Patent No.: US 9,423,727 B2
(45) Date of Patent: Aug. 23, 2016

(54) INTERMEDIATE TRANSFER MEMBER AND ELECTROPHOTOGRAPHIC APPARATUS

(71) Applicant: CANON KABUSHIKI KAISHA, Tokyo (JP)

(72) Inventors: Toshiyuki Yoshida, Yokohama (JP); Eiichi Hamana, Inagi (JP); Yasutomo Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 283 days.

(21) Appl. No.: 14/075,404

(22) Filed: Nov. 8, 2013

(65) Prior Publication Data

US 2014/0162068 A1    Jun. 12, 2014

(30) Foreign Application Priority Data

Dec. 7, 2012    (JP) .................. 2012-268701

(51) Int. Cl.
*B32B 27/20*     (2006.01)
*B32B 27/30*     (2006.01)
*G03B 15/16*     (2006.01)
*G03G 15/16*     (2006.01)

(52) U.S. Cl.
CPC ............. *G03G 15/162* (2013.01); *B32B 27/20* (2013.01); *B32B 27/308* (2013.01); *Y10T 428/31504* (2015.04)

(58) Field of Classification Search
None
See application file for complete search history.

(56) References Cited

U.S. PATENT DOCUMENTS

2007/0253752 A1*  11/2007  Kurachi ............. G03G 15/162
                                                         399/302
2013/0149541 A1*   6/2013  Sakamoto ........... G03G 15/162
                                                         428/411.1

FOREIGN PATENT DOCUMENTS

JP          2012-68344 A      4/2012

* cited by examiner

*Primary Examiner* — Ramsey Zacharia
(74) *Attorney, Agent, or Firm* — Fitzpatrick, Cella, Harper & Scinto

(57) ABSTRACT

The intermediate transfer member is an intermediate transfer member for electrophotography, including a surface layer having a surface for carrying toner, in which: the surface layer contains a fluorine-modified curable resin having one of an acryloyl group and a methacryloyl group, and electro-conductive inorganic particles; and the surface layer has a ratio of the number of atoms of an element derived from the electro-conductive inorganic particles to the total number of atoms to be detected through analysis of the surface by X-ray photoelectron spectroscopy of 2.5 atomic % or more and 10 atomic % or less, and a peak detected at a position corresponding to a mass-to-charge ratio [m/z] of one of m/z=71 and m/z=85 in analysis of the surface by time-of-flight secondary ion mass spectrometry.

7 Claims, 2 Drawing Sheets

INTERMEDIATE TRANSFER MEMBER AND ELECTROPHOTOGRAPHIC APPARATUS

BACKGROUND OF THE INVENTION

1. Field of the Invention

The present invention relates to an intermediate transfer member to be mounted on an electrophotographic apparatus and an electrophotographic apparatus.

2. Description of the Related Art

The following intermediate transfer system has been employed in some of color electrophotographic apparatus. Developed images of four colors, i.e., yellow, magenta, cyan, and black colors are transferred from a photosensitive member onto an intermediate transfer member in a superimposed manner, and then the images are collectively transferred onto a printing medium such as paper.

In such intermediate transfer system, a secondary transfer process involving transferring a toner image on the intermediate transfer member onto the printing medium exists. In addition, in the secondary transfer process, the following has been performed for efficiently transferring the toner image onto the printing medium. A transfer roller and an opposing roller are disposed opposite to each other across the intermediate transfer member, and a secondary transfer voltage is applied between the transfer roller and the opposing roller.

Meanwhile, the following has been proposed for further improving the efficiency with which the toner image is transferred onto the printing medium in the secondary transfer process. The surface of the intermediate transfer member on a toner image-bearing side is provided with a functional layer for improving the releasability of the toner image.

Japanese Patent Application Laid-Open No. 2012-68344 proposes an endless belt for an image-forming apparatus, the belt having a surface layer whose outermost surface is constituted of a composite resin composition containing: 25 to 80 mass % of a fluorinated polyimide resin having an ether group on its main chain; 10 to 65 mass % of a fluorine resin; and 10 to 50 mass % of conductive particles. In addition, Japanese Patent Application Laid-Open No. 2012-68344 discloses that according to such endless belt, good releasability of a toner image can be held over a long period of time.

By the way, the inventors of the present invention have found that in an image-forming apparatus using an intermediate transfer member having a surface subjected to a treatment for improving the releasability of a toner image with a fluorine-based resin, secondary transfer efficiency may gradually reduce as the number of printed sheets increases. In addition, the inventors of the present invention have conducted an investigation on a cause for the foregoing. Then, the inventors have found that the amount of fluorine atoms on the surface of the intermediate transfer member reduces as the number of printed sheets increases, and as a result, the toner releasability of the surface of the intermediate transfer member reduces to lower the secondary transfer efficiency. The reason why the amount of the fluorine atoms on the surface of the intermediate transfer member reduces as the number of printed sheets increases is assumed as described below. The application of the secondary transfer voltage between the transfer roller and the opposing roller causes discharge between the surface of the intermediate transfer member and the transfer roller, and the fluorine-based resin on the surface of the intermediate transfer member, albeit in a slight amount, is decomposed by the discharge.

SUMMARY OF THE INVENTION

In view of the foregoing, the present invention is directed to providing an intermediate transfer member that hardly reduces in toner releasability of its surface even after its long-term use and can maintain high secondary transfer efficiency over a long period of time.

The present invention is also directed to providing an electrophotographic apparatus capable of stably forming high-quality electrophotographic images over a long period of time.

According to one aspect of the present invention, there is provided an intermediate transfer member for electrophotography, including a surface layer having a surface for carrying toner, in which: the surface layer contains a fluorine-modified curable resin having one of an acryloyl group and a methacryloyl group, and electro-conductive inorganic particles; and the surface layer has a ratio of the number of atoms of an element derived from the electro-conductive inorganic particles to the total number of atoms to be detected through analysis of the surface by X-ray photoelectron spectroscopy of 2.5 atomic % or more and 10 atomic % or less, and in an analysis of the surface of the surface layer by time-of-flight secondary ion mass spectroscopy, a peak is detected at a position corresponding to a mass-to-charge ratio [m/z] of one of m/z=71 and m/z=85.

In addition, according to another aspect of the present invention, there is provided an electrophotographic apparatus, including the intermediate transfer member. Further features of the present invention will become apparent from the following description of exemplary embodiments with reference to the attached drawings.

DESCRIPTION OF THE EMBODIMENTS

The inventors of the present invention have made extensive studies to achieve the objects. As a result, the inventors have found that when electro-conductive inorganic particles are partially exposed to the toner image-bearing surface of an intermediate transfer body, a reduction in amount of fluorine atoms on the surface over time is suppressed, and hence a reduction in releasability of toner and a reduction in secondary transfer efficiency resulting from the reduction can be effectively suppressed.

Here, the inventors of the present invention have considered the reason why the effect is exerted by the intermediate transfer body obtained by exposing the electro-conductive inorganic particles to the toner image-bearing surface of the intermediate transfer body to be as described below.

That is, a discharge phenomenon to the toner image-bearing surface of the intermediate transfer member occurs in a minute space produced between a secondary transfer roller and a secondary transfer opposing roller upon rotation of the respective rollers.

At this time, in such an intermediate transfer member that conductive fine particles are not exposed to its surface layer, charge generated by discharge acts on a fluorine-modified resin to cause a reduction in amount of fluorine on the surface of the intermediate transfer member.

On the other hand, when the electro-conductive inorganic particles are exposed to the surface of the surface layer containing the fluorine-modified resin, the charge generated by the discharge acts preferentially on the electro-conductive inorganic particles rather than on the fluorine-modified resin. Accordingly, the quantity of the charge acting on the fluorine-modified resin constituting the surface of the intermediate transfer body relatively reduces and hence the reduction in amount of fluorine on the surface of the intermediate transfer body can be suppressed.

It is assumed that as a result of the foregoing, the surface characteristics of the intermediate transfer body containing the fluorine-modified resin hardly change over time, and hence an intermediate transfer member for electrophotography whose surface hardly reduces in toner releasability over a long period of time can be obtained.

Hereinafter, a suitable embodiment of the present invention is described.

<Electrophotographic Apparatus>

Figure 3:
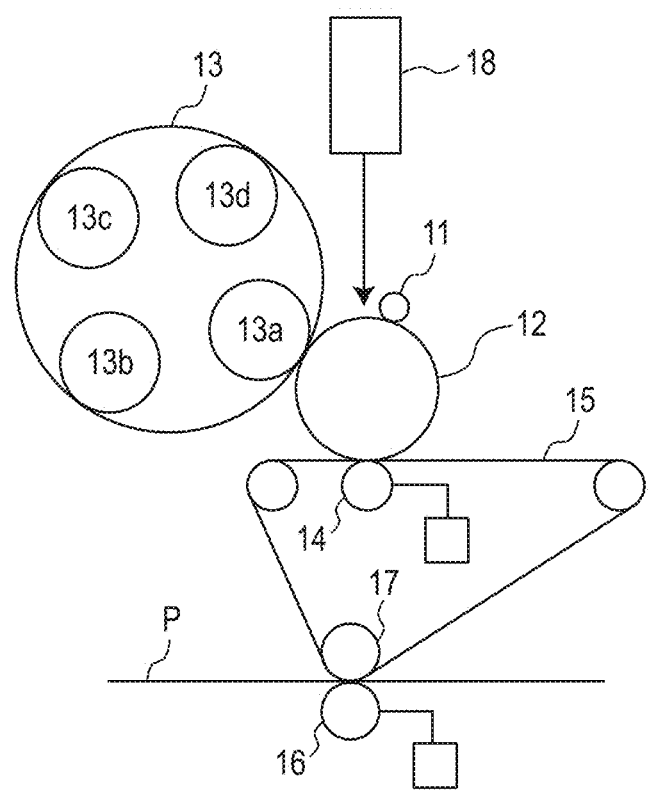
FIG. 3 is a schematic view illustrating a construction example of an electrophotographic apparatus including an intermediate transfer belt.

In such an electrophotographic apparatus including an intermediate transfer belt 15 as illustrated in FIG. 3, a photosensitive member (latent image-bearing member) 12 uniformly charged by a charging unit 11 is irradiated with exposure light from an exposing apparatus 18 such as laser light. As a result, electrostatic latent images are formed. Charged toners are carried from developing units 13 for four respective colors (yellow 13*a*, magenta 13*b*, cyan 13*c*, and black 13*d*) on the photosensitive member 12 to form toner images sequentially. A transfer bias is applied to the toner images formed on the photosensitive member 12 at a portion where a primary transfer roller 14 and the photosensitive member 12 abut on each other to superimpose the toner images on the intermediate transfer belt 15 sequentially. The four color toner images formed on the intermediate transfer belt 15 are collectively transferred onto a transfer paper (recording medium) P at a portion where a secondary transfer roller 16 and a secondary transfer opposing roller 17 abut on each other. Thus, an image is formed.

<Intermediate Transfer Member>

An intermediate transfer member of the present invention is described. The intermediate transfer member adopts a laminated structure formed of at least a surface layer for carrying toner and a base material layer.

Figure 1:
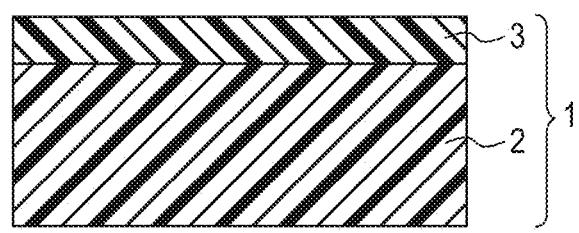
FIG. 1 is a partial schematic sectional view of an intermediate transfer member according to one embodiment of the present invention.

FIG. 1 illustrates a schematic sectional view of the intermediate transfer member of the present invention. Reference numeral 1 represents the intermediate transfer member, reference numeral 2 represents a base material layer, and reference numeral 3 represents a surface layer obtained by laminating a curable resin on the base material layer 2. The thickness of the base material layer 2 is generally 10 μm or more and 500 μm or less, in particular, 30 μm or more and 150 μm or less. A thickness of 0.05 μm or more and 20 μm or less, in particular, 0.1 μm or more and 5 μm or less is suitably used as the thickness of the surface layer 3. It is to be noted that another layer may be present.

<Base Material Layer>

As a material for the base material layer 2, there are given, for example, thermoplastic resins such as a polycarbonate, a polyvinylidene fluoride (PVDF), a polyethylene, a polypropylene, a polymethylpentene-1, a polystyrene, a polyamide, a polysulfone, a polyarylate, a polyethylene terephthalate, a polybutylene terephthalate, a polyethylene naphthalate, a polybutylene naphthalate, a polyphenylene sulfide, a polyether sulfone, a polyether nitrile, a thermoplastic polyimide, a polyether ether ketone, a thermotropic liquid crystal polymer, and a polyamic acid.

Two or more kinds of those materials can be used as a mixture. In addition, the base material layer of the intermediate transfer member can be obtained by: melting and kneading a conductive material or the like into any such thermoplastic resin; and then molding the resultant by a molding method appropriately selected from, for example, inflation molding, cylindrical extrusion molding, and injection stretch blow molding.

<Surface Layer>

The surface layer is preferably formed by using a curable resin capable of curing with, for example, heat, or an energy ray such as UV light or an electron beam from the viewpoints of increasing the surface hardness of the intermediate transfer member and improving its abrasion resistance.

In addition, the resin constituting the surface layer needs to have a fluorine atom in a molecule thereof for improving the releasability of toner from the surface of the intermediate transfer member.

Such surface layer can be formed by using a curable resin composition containing at least one of: a fluorine-modified curable resin having one or both of an acryloyl group and a methacryloyl group as reactive groups, and having a fluorine atom introduced into a molecule thereof; and a curable resin having at least one of an acryloyl group and a methacryloyl group, and a fluorine-based compound capable of reacting with the curable resin.

The fluorine-modified curable resin having an acryloyl group is, for example, a UV-curable fluorine-based hard coat material for plastic "Y-Coat VH340" (trade name; manufactured by The Yokohama Rubber Company, Limited). In addition, the fluorine-based compound capable of reacting with the curable resin having at least one of an acryloyl group and a methacryloyl group is, for example, a compound having a reactive functional group capable of participating in a reaction for curing the curable resin. Such fluorine-based compound is, for example, a fluorine-based compound to be added to a UV-curable resin "OPTOOL DAC-HP" (trade name; manufactured by DAIKIN INDUSTRIES, LTD.).

In addition, when the surface of the intermediate transfer member according to the present invention is analyzed by time-of-flight secondary ion mass spectrometry, a peak is detected at a position corresponding to a mass-to-charge ratio [m/z] of m/z=71 or m/z=85. The foregoing means that an acryloyl group or a methacryloyl group is present in a region of the intermediate transfer belt that can be detected by TOF-SIMS, i.e., a region from the surface (toner-carrying surface) to a depth of about 10 nm. It is to be noted that in the present invention, when an acryloyl group or a methacryloyl group is present in the region, the acryloyl group or the methacryloyl group is regarded as being exposed to the surface of the intermediate transfer member.

The curable resin having an acryloyl group or a methacryloyl group as a reactive group cures through a reaction of the reactive group. In ordinary cases, however, not all reactive groups undergo a reaction and the cured resin has a certain amount of reactive groups even after the curing. Therefore, the confirmation of the presence of an acryloyl group or methacryloyl group present on the surface of the surface layer serves as means for proving that the cured resin is exposed to the surface of the surface layer.

<Electro-Conductive Inorganic Particles>

The surface layer according to the present invention contains electro-conductive inorganic particles. The electro-conductive inorganic particles are incorporated for controlling the electric resistance of the surface layer. Inorganic particles that express electron conductivity are used. Examples of such inorganic particles are given below:

carbon-based substances such as carbon black, carbon beads obtained by granulating carbon black, carbon fibers, and graphite; metals such as copper, silver, aluminum, nickel, zinc, and iron, and alloys thereof; conductive metal oxides such as tin oxide, indium oxide, antimony oxide, and an $SnO_2$—$In_2O_3$ composite oxide; and doped metal oxides such as antimony-doped tin oxide, tin-doped indium oxide, and aluminum-doped zinc oxide. One kind or more are appropriately selected from those conductive materials. Of those, electro-conductive inorganic particles formed of a metal, a conductive metal oxide, or a doped metal oxide are suitably used because the particles facilitate a surface hydrophobization treatment to be described later.

In addition, in the surface layer according to the present invention, an ion conductive material may be mixed and used in addition to the electro-conductive inorganic oxide.

By the way, the surface layer according to the present invention has a ratio of the number of atoms of an element derived from the electro-conductive inorganic particles to the total number of atoms to be detected through the analysis of its surface by X-ray photoelectron spectroscopy of 2.5 atomic % or more and 10 atomic % or less.

Herein, the fact that the element derived from the electro-conductive inorganic particles is detected in the surface analysis of the toner-carrying surface of the intermediate transfer member by X-ray photoelectron spectroscopy (XPS) means that the electro-conductive inorganic particles are present in a region of the intermediate transfer belt that can be detected by XPS, i.e., a range from the surface (toner-carrying surface) of the intermediate transfer belt to a depth of about 10 nm. In the present invention, when the electro-conductive inorganic particles are present in the region, the electro-conductive inorganic particles are regarded as being exposed to the surface of the intermediate transfer member.

In addition, the fact that the ratio of the number of atoms of the element derived from the conductive particles to the total number of atoms to be detected through the surface analysis of the toner-carrying surface by X-ray photoelectron spectroscopy is 2.5 atomic % or more and 10 atomic % or less means that a certain amount of the electro-conductive inorganic fine particles are exposed to the toner-carrying surface of the intermediate transfer member. It is assumed that as a result of the foregoing, the discharge of the toner-carrying surface converges on the electro-conductive inorganic particles and hence the decomposition of the fluorine-modified curable resin by the discharge is alleviated.

In addition, when the ratio of the number of atoms of the element derived from the conductive particles to the total number of atoms to be detected through the surface analysis of the toner-carrying surface by X-ray photoelectron spectroscopy is less than 2.5 atom %, it becomes difficult to effectively suppress the decomposition of the fluorine-modified resin exposed to the surface of the surface layer by the discharge. On the other hand, when the ratio of the number of atoms of the element derived from the conductive particles to the total number of atoms to be detected through the surface analysis of the toner-carrying surface by X-ray photoelectron spectroscopy exceeds 10 atomic %, the amount of the conductive particles exposed to the surface of the surface layer becomes excessive. That is, the amount of the fluorine-modified resin, which should originally contribute to an improvement in toner releasability of the surface of the intermediate transfer member, exposed to the surface of the surface layer relatively reduces and hence it becomes difficult to maintain the toner releasability of the toner-carrying surface over a long period of time.

In order to expose the electro-conductive inorganic particles to the surface of the surface layer, upon the formation of the surface layer, it is preferred to use electro-conductive inorganic particles having surfaces subjected to a hydrophobization treatment. As a hydrophobization agent, there are given, for example, a coupling agent (whose central element is, for example, silicon, titanium, aluminum, or zirconium, and is not particularly limited), oil, varnish, and an organic compound are given. Of those, a fluoroalkylalkoxysilane coupling agent (fluorine-based silane coupling agent) is particularly preferred.

Two methods, i.e., a dry method and a wet method can each be employed as a method for the hydrophobization treatment of the electro-conductive inorganic particles, for example, when the fluorine-based silane coupling agent is used. The wet method that is a method involving dispersing the electro-conductive inorganic particles in a solvent, diluting the silane coupling agent with water or an organic solvent, and adding the diluted agent in a slurry state while stirring the dispersion is preferred because the method enables a uniform treatment. Further, the electro-conductive inorganic particles may be subjected to an oxidation treatment in an acid or alkali solution so that the hydrophobization treatment may be easily performed. In addition, untreated electro-conductive inorganic particles may be used in combination with the hydrophobized electro-conductive inorganic particles.

A coating liquid to be used for forming the surface layer according to the present invention contains at least one of the following components (i) and (ii), and the following component (iii):

(i) a fluorine-modified curable resin having at least one of an acryloyl group and a methacryloyl group;
(ii) a curable resin having at least one of an acryloyl group and a methacryloyl group, and a fluorine-based compound having a functional group reactive to the curable resin; and
(iii) electro-conductive inorganic particles having surfaces subjected to a hydrophobization treatment.

The coating liquid can contain an organic solvent for the improvement of its coatability and the adjustment of the thickness of an intermediate layer. The blending amount of the organic solvent in the composition for forming the surface layer is set to preferably 30 to 90 parts by mass, particularly preferably 60 to 80 parts by mass with respect to 100 parts by mass of the entire composition. Setting the blending amount within the range can additionally improve the coatability of the coating liquid for forming the surface layer.

In addition, with regard to the electro-conductive inorganic particles, an organic solvent can be appropriately used as a solvent for adjusting their dispersibility and stability. The blending amount of the electro-conductive inorganic particles in the coating liquid for forming the surface layer, which can be appropriately adjusted so that desired conductivity may be obtained at the time of coating, is set to preferably 1 to 50 parts by mass, particularly preferably 15 to 30 parts by mass with respect to 100 parts by mass of the curable resins. Thus, suitable conductivity can be imparted to the intermediate transfer member.

The organic solvent is not particularly limited, and specific examples thereof may include: alcohols such as methanol, ethanol, isopropanol, butanol, and octanol; ketones such as acetone, methyl ethyl ketone (MEK), methyl isobutyl ketone, and cyclohexanone; esters such as ethyl acetate, butyl acetate, ethyl lactate, γ-butyrolactone, propylene glycol monomethyl ether acetate, and propylene glycol monoethyl ether acetate; ethers such as ethylene glycol monomethyl ether and diethylene glycol monobutyl ether; aromatic hydrocarbons such as benzene, toluene, and xylene; and amides such as dimethylformamide, dimethylacetamide, and N-methylpyrrolidone. Of those, methyl isobutyl ketone, methyl ethyl ketone, cyclohexanone, propylene glycol monomethyl ether acetate, propylene glycol monoethyl ether acetate, toluene, xylene, and the like are preferred.

The coating liquid for forming the surface layer of the intermediate transfer member can be obtained by appropriately diluting and mixing the curable resin and the electro-conductive inorganic particles.

In addition, a function imparting additive such as a polymerization inhibitor, a polymerization initiation aid, a leveling agent, a lubricant, a wettability improving agent, a surfactant, a plasticizer, a viscosity modifying agent, a UV absorbent, an antioxidant, an antistatic agent, an inorganic filler, a dispersant for pigment and the like, or a film thickness controlling agent may be appropriately selected and added to the coating liquid for forming the surface layer.

As a method for coating with the coating liquid for forming the surface layer, there may be given, for example, general coating methods such as dip coating, slit coating, spray coating, roll coating, and spin coating. Appropriate selection of those methods can result in the formation of a coating layer having a desired thickness. Further, an intermediate transfer member on which the surface layer has been formed can be obtained by curing the coating layer by a method that is appropriate for the curable resins. In addition, a measured value for the pencil hardness of the surface layer in the intermediate transfer member of the present invention is preferably 1H or more, particularly preferably 2H or more.

Figure 2:
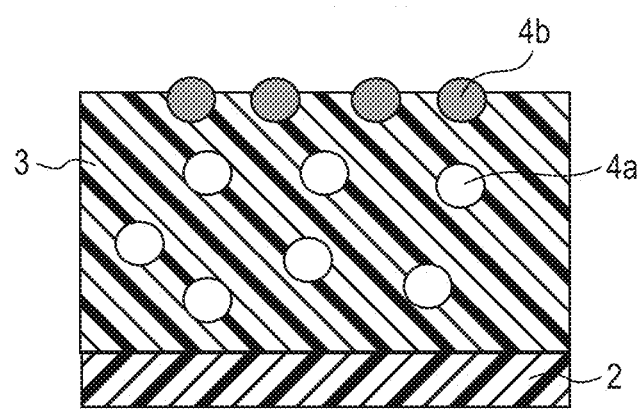
FIG. 2 is an enlarged schematic view of a surface layer portion in a sectional view of the intermediate transfer member according to the one embodiment of the present invention.

FIG. 2 illustrates an enlarged schematic view of the surface layer portion in a section of the intermediate transfer member in the present invention. Electro-conductive inorganic particles 4a, which are not subjected to any surface treatment, in the surface layer 3 constituted of a fluorine-containing resin do not reach the vicinity of its surface in ordinary cases because the particles each have higher surface energy than that of the fluorine-modified resin. On the other hand, electro-conductive inorganic particles 4b whose surfaces have been hydrophobized by a surface treatment with a fluorine-based silane coupling agent such as a fluoroalkylalkoxysilane coupling agent each have lower surface energy than that of the fluorine-modified resin. Accordingly, the particles move to a surface side in a formation process for the surface layer and hence can be exposed to the surface of the surface layer.

The intermediate transfer member on which the surface layer has been formed is evaluated by respective analysis methods to be described later.

<Evaluation Method>

Next, the evaluations of the intermediate transfer member are described.

The ratio of the number of atoms of an element derived from the electro-conductive inorganic particles to the total number of atoms in the toner-carrying surface of the intermediate transfer member was measured by X-ray photoelectron spectroscopy with an X-ray photoelectron spectrophotometer ("Quantera SXM" manufactured by ULVAC-PHI, Inc.). At the time of the measurement, the sample was irradiated with an X-ray under the conditions of 25 W and 15 kV.

In addition, aluminum was used in an anticathode. The range of the sample to be irradiated with the X-ray was set to have a diameter of 100 μm and an angle of 45° was used as the detection angle of a photoelectron. A spectrum range was set to a range of 0 to 1,300 eV, pass energy was set to 140 eV, a step size was set to 1 eV, and the number of sweeps was set to 10.

Meanwhile, a TOF-SIMS-V manufactured by ION-TOF was used as an analyzer in the surface analysis of the surface layer of the intermediate transfer member of the present invention by time-of-flight secondary ion mass spectrometry (TOF-SIMS). In addition, conditions for the analysis were as follows: $Bi^{3+}$ ($1\times10^{12}$ ions/cm$^2$) was used as a primary ion, the acceleration voltage of an ion gun was set to 25 keV, a mass range was set to a range of 1 amu to 800 amu, a scanning range measured 100 μm by 100 μm, and the number of integrations was set to 32.

Further, the evaluation of the surface layer in the intermediate transfer member for its pencil hardness was performed in conformity with JIS-K5600.

In addition, at the time of the evaluation of the intermediate transfer member for image quality, the intermediate transfer member of the present invention was mounted as an intermediate transfer belt on an intermediate transfer unit of a copying machine (trade name: IR-ADVANCE C5051; manufactured by Canon Inc.) on which the intermediate transfer member was to be mounted as an intermediate transfer belt. Images printed on the first sheet and 500,000-th sheet of A4-size plain paper (trade name: GF-600, 60 g/m$^2$; manufactured by Canon Inc.) under an environment having a temperature of 15° C. and a relative humidity of 10% were observed.

Then, a good image in which density unevenness or a spot due to the failure of the transfer of toner was not observed was evaluated as an "A" rank, and an image in which the unevenness or the spot was observed was evaluated as a "B" rank.

The present invention is described in detail by describing examples and comparative examples below. However, the scope of the present invention is not limited thereto.

It is to be noted that in each of the following examples, a cylindrical polyimide film was used as the base material layer of an intermediate transfer member.

In addition, the surface layer of the intermediate transfer member was obtained by coating the base material layer with a composition for forming a surface layer shown in Table 1 or Table 2 by slit coating and curing the composition with UV light. With regard to a condition for the curing with UV light, the composition was irradiated with UV light by using a UV light irradiator (trade name: UE06/81-3; manufactured by EYE GRAPHICS CO., LTD.) until a cumulative light quantity became 1,200 mJ/cm$^2$. All thicknesses of the base materials of the intermediate transfer members were 80 μm, and the thicknesses of the surface layers thereof were set within the range of 2 to 3 μm.

Table 1 and Table 2 show the components of coating liquids for forming surface layers according to the examples and comparative examples, and their amounts. It is to be noted that the amounts in Table 1 and Table 2 are represented in a "part(s) by mass" unit.

In each of the coating liquids for forming surface layers shown in Table 1 and Table 2, a UV-curable fluorine-based hard coat material for plastic "Y-Coat VH340" (trade name; manufactured by The Yokohama Rubber Company, Limited) having an acryloyl group was used as the "fluorine-modified curable resin having at least one of an acryloyl group and a methacryloyl group" as the component (i).

In addition, a polyfunctional methacrylate monomer "TMPT" (trade name; manufactured by Shin-Nakamura Chemical Co., Ltd.) as a curable resin having a methacryloyl group was used as the "curable resin having at least one of an acryloyl group and a methacryloyl group" in the component (ii). In addition, a fluorine-based compound to be added to a UV-curable resin "OPTOOL DAC-HP" (trade name; manufactured by DAIKIN INDUSTRIES, LTD.) was used as the fluorine-based compound having a functional group reactive to the curable resin. It is to be noted that the "OPTOOL DAC-HP" was used in a ratio of 10 parts by mass with respect to 100 parts by mass of the "TMPT."

In addition, conductive zinc oxide (manufactured by C. I. KASEI CO., LTD.) and conductive tin oxide (manufactured by C. I. KASEI CO., LTD.) were used as the electro-conductive inorganic particles. In addition, triethoxy-1H,1H,2H,2H-tridecafluoro-n-octylsilane (manufactured by Tokyo Chemical Industry Co., Ltd.) as a fluorine-modified silane was used for the hydrophobization of the electro-conductive inorganic particles.

TABLE 1

|  | Example | | | | | | | |
| --- | --- | --- | --- | --- | --- | --- | --- | --- |
|  | 1 | 2 | 3 | 4 | 5 | 6 | 7 | 8 |
| (i) Fluorine-modified curable resin having acryloyl group | 100 | 100 | 100 | 100 | 0 | 0 | 0 | 0 |
| (ii) Curable resin having methacryloyl group + fluorine-based compound having reactive functional group | 0 | 0 | 0 | 0 | 100 | 100 | 100 | 100 |
| (iii) Conductive zinc oxide (subjected to hydrophobization treatment) | 5 | 10 | 0 | 0 | 5 | 10 | 0 | 0 |
| Conductive zinc oxide (not subjected to hydrophobization treatment) | 15 | 10 | 0 | 0 | 15 | 10 | 0 | 0 |
| (iii) Conductive tin oxide (subjected to hydrophobization treatment) | 0 | 0 | 5 | 10 | 0 | 0 | 4 | 10 |
| Conductive tin oxide (not subjected to hydrophobization treatment) | 0 | 0 | 15 | 10 | 0 | 0 | 16 | 10 |

Unit: part(s) by mass

TABLE 2

|  | Comparative Example | | | |
| --- | --- | --- | --- | --- |
|  | 1 | 2 | 3 | 4 |
| (i) Fluorine-modified curable resin having acryloyl group | 100 | 100 | 100 | 100 |
| (ii) Curable resin having methacryloyl group + fluorine-based compound having reactive functional group | 0 | 0 | 0 | 0 |
| (iii) Conductive zinc oxide (subjected to hydrophobization treatment) | 0 | 0 | 0 | 0 |
| Conductive zinc oxide (not subjected to hydrophobization treatment) | 0 | 0 | 0 | 0 |
| (iii) Conductive tin oxide (subjected to hydrophobization treatment) | 0 | 2 | 15 | 25 |
| Conductive tin oxide (not subjected to hydrophobization treatment) | 20 | 19 | 5 | 0 |

Unit: part(s) by mass

Examples 1 to 8

Intermediate transfer belts according to Examples 1 to 8 including surface layers formed by using the compositions for forming surface layers according to Examples 1 to 8 each having composition shown in Table 1 were formed. Table 3 shows the results of the evaluations of those intermediate transfer belts. The belts were each suitable for use as an intermediate transfer belt because both the images printed on the first sheet and 500,000-th sheet were each a good image free of density unevenness or a spot due to the failure of the transfer of toner.

Comparative Examples 1 to 4

Intermediate transfer belts according to Comparative Examples 1 to 4 including surface layers formed by using the compositions for forming surface layers according to Comparative Examples 1 to 4 each having composition shown in Table 2 were formed. Table 4 shows the results of the evaluations of those intermediate transfer belts.

The belts were each suitable for use as an intermediate transfer belt because the image printed on the first sheet was a good image free of density unevenness or a spot due to the failure of the transfer of toner. However, the belts were each unsuitable for an electrophotographic application because density unevenness or a spot due to the failure of the transfer of toner occurred in the image printed on the 500,000-th sheet

TABLE 3

| | Example | | | | | | | |
|---|---|---|---|---|---|---|---|---|
| | 1 | 2 | 3 | 4 | 5 | 6 | 7 | 8 |
| Ratio of number of atoms of metal element by XPS (atomic %) | 4.8 | 10.0 | 3.7 | 8.2 | 5.1 | 9.0 | 2.5 | 8.5 |
| Presence or absence of peak at position corresponding to m/z = 71 or 85 by TOF-SIMS | Present | Present | Present | Present | Present | Present | Present | Present |
| Pencil hardness | 2H | 3H | 2H | 3H | H | 2H | H | 2H |
| Printed image evaluation — First sheet | A | A | A | A | A | A | A | A |
| Printed image evaluation — 500,000-th sheet | A | A | A | A | A | A | A | A |

TABLE 4

| | Comparative Example | | | |
|---|---|---|---|---|
| | 1 | 2 | 3 | 4 |
| Ratio of number of atoms of metal element by XPS (atomic %) | 0.0 | 0.8 | 13.5 | 24.0 |
| Presence or absence of peak at position corresponding to m/z = 71 or 85 by TOF-SIMS | Present | Present | Present | Absent |
| Pencil hardness | B | 2H | 3H | 3H |
| Printed image evaluation — First sheet | A | A | A | A |
| Printed image evaluation — 500,000-th sheet | B | B | B | B |

In each of the intermediate transfer belts according to Examples 1 to 8, the ratio of the number of atoms of the metal element constituting the electro-conductive inorganic particles to the total number of atoms to be detected through the surface analysis of the surface layer side of the intermediate transfer member by X-ray photoelectron spectroscopy (XPS) was 2.5 atomic % or more and 10 atomic % or less.

In addition, in the surface analysis of the surface layer side of the intermediate transfer member by time-of-flight secondary ion mass spectrometry (TOF-SIMS), a peak was detected at a position corresponding to a mass-to-charge ratio [m/z] of m/z=71 or m/z=85.

In other words, in each of the intermediate transfer belts according to Examples 1 to 8, the electro-conductive inorganic particles were present in a region that could be detected by XPS, i.e., a range from the surface (toner-carrying surface) of the intermediate transfer belt to a depth of about 10 nm. In addition, in each of the intermediate transfer belts according to Examples 1 to 8, an acryloyl group or a methacryloyl group was present in a region that could be detected by TOF-SIMS, i.e., a region from the surface (toner-carrying surface) to a depth of about 10 nm.

That is, the electro-conductive inorganic particles and the acryloyl group or the methacryloyl group coexisted on the surface of each of the intermediate transfer belts according to Examples 1 to 8. When printing was performed with such intermediate transfer belt as an intermediate transfer belt, each of both the images printed on the first sheet and 500,000-th sheet showed neither density unevenness nor a spot.

On the other hand, each of the intermediate transfer belts according to Comparative Examples 1 and 2 was probably unable to sufficiently suppress the deterioration of the fluorine-modified resin exposed to the surface of the surface layer by discharge because the amount of the electro-conductive inorganic particles exposed to the surface of the surface layer was small.

In addition, in each of the intermediate transfer belts according to Comparative Examples 3 and 4, the amount of the electro-conductive inorganic particles exposed to the surface of the surface layer was excessive. In particular, with regard to the intermediate transfer belt according to Comparative Example 4, the presence of an acryloyl group could not be confirmed even through the analysis of the surface layer by TOF-SIMS in spite of the fact that the surface layer was formed by using the fluorine-modified curable resin having an acryloyl group. This is probably because the surface of the surface layer was covered with the electro-conductive inorganic particles.

It is to be noted that in each of the intermediate transfer belts according to Comparative Examples 3 and 4, the image printed on the first sheet was evaluated as the "A" rank probably because the electro-conductive inorganic particles subjected to a surface treatment with a fluorine-modified silane were exposed to the surface. However, discharge converges on the electro-conductive inorganic particles in a formation process for an electrophotographic image, the fluorine-modified silane present on the surface is decomposed, and the toner releasability of the toner-carrying surface of the intermediate transfer belt reduces over time. Probably because of the foregoing, the image printed on the 500,000-th sheet was evaluated as the "B" rank.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268701, filed Dec. 7, 2012, which is hereby incorporated by reference herein in its entirety.

What is claimed is:

1. An intermediate transfer member for electrophotography, comprising a surface layer having a surface for carrying toner,
  wherein:
    the surface layer contains
      a fluorine-modified curable resin having one of an acryloyl group and a methacryloyl group, and
      electro-conductive inorganic particles;
    the surface layer has a ratio of a number of atoms of an element derived from the electro-conductive inorganic particles to a total number of atoms to be detected through analysis of the surface by X-ray photoelectron spectroscopy of 2.5 atomic % or more and 10 atomic % or less; and in an analysis of the surface of the surface layer by time-of-flight secondary ion mass spectroscopy, a peak is detected at a position corresponding to a mass-to-charge ratio [m/z] of one of m/z=71 and m/z=85.

2. The intermediate transfer member according to claim 1, wherein the fluorine-modified curable resin comprises a curable resin capable of curing with an energy ray.

3. The intermediate transfer member according to claim 1, wherein the electro-conductive inorganic particles comprise electro-conductive inorganic particles formed of a metal oxide.

4. The intermediate transfer member according to claim 1, wherein surfaces of the electro-conductive inorganic particles have been subjected to a hydrophobization treatment.

5. The intermediate transfer member according to claim 4, wherein the hydrophobization treatment for the surfaces of the electro-conductive inorganic particles is performed with a fluorine-based silane coupling agent.

6. An electrophotographic apparatus, comprising the intermediate transfer member according to claim 1.

7. An intermediate transfer member for electrophotography, comprising a surface layer having a surface for carrying toner, wherein:
the surface layer contains
a fluorine-modified curable resin having one of an acryloyl group and a methacryloyl group, and
electro-conductive inorganic particles;
the surface layer has a ratio of a number of atoms of an element derived from the electro-conductive inorganic particles to a total number of atoms to be detected through analysis of the surface by X-ray photoelectron spectroscopy of 2.5 atomic % or more and 10 atomic % or less;
in an analysis of the surface of the surface layer by time-of-flight secondary ion mass spectroscopy, a peak is detected at a position corresponding to a mass-to-charge ratio [m/z] of one of m/z=71 and m/z=85; and
the surface layer is a cured coating layer of a coating liquid for forming the surface layer, the coating liquid for forming the surface layer containing the electro-conductive inorganic particles having been subjected to a hydrophobization treatment, and at least one of the following (i) and (ii):
(i) a fluorine-modified curable resin having at least one of an acryloyl group and a methacryloyl group; and
(ii) a curable resin having at least one of an acryloyl group and a methacryloyl group, and a fluorine-based compound having a functional group reactive to the curable resin.

* * * * *